United States Patent [19]

Grove et al.

[11] 4,387,971
[45] Jun. 14, 1983

[54] DYNAMIC DAMPING SYSTEM

[75] Inventors: Charles F. Grove, Costa Mesa; David A. Rodriguez, Capistrano Beach, both of Calif.

[73] Assignee: The United States of America as represented by the Secretary of the Air Force, Washington, D.C.

[21] Appl. No.: 192,406

[22] Filed: Sep. 30, 1980

[51] Int. Cl.³ .......................................... G02B 23/00
[52] U.S. Cl. .................................. 350/500; 356/250
[58] Field of Search .................. 350/16; 356/149, 250; 74/574; 188/379, 380; 318/623

[56] References Cited

U.S. PATENT DOCUMENTS 2,779,231 1/1957 Drodofsky ..................... 356/149 X
3,612,643 10/1971 Weber ............................. 350/16 X
4,105,281 8/1978 Johnson et al. ................. 350/16 X Primary Examiner—John K. Corbin
Assistant Examiner—Matthew W. Koren
Attorney, Agent, or Firm—Donald J. Singer; Jacob N. Erlich

[57] ABSTRACT

A dynamic damping system for stabilizing the motion of a large object with respect to inertial space by adding mechanical damping to an angular positioning servo system for the object. The mechanical damping is achieved by a dynamic damper assembly which attaches to an inertial balancer that provides inertia feedback to the servo system. The dynamic damper assembly along with the inertia balancer mechanically assist the positioning servo system.

10 Claims, 4 Drawing Figures

DYNAMIC DAMPING SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates generally to vibration damping systems, and, more particularly to a dynamic damping system which aids a positioning servo system to accurately position gimballed objects with respect to inertial space.

It is necessary in many instances, to accurately position with negligible jitter or vibration, large gimballed bodies. For example, in many of today's optical systems it is necessary to maintain, for optical accuracy, a mirror or other optical equipment in stable position with respect to space. In optical systems used in the past, the optical elements (mirrors, etc.) being stabilized were relatively small, and thus possessed low inertias. The consequential coupling resonant frequencies associated with these relatively small elements were high, and were therefore easily removed from the servo loop with electronic filters.

With todays larger aperture systems required for infrared sensors, large mirrors are required for image stabilization. Unfortunately, because the large mirrors have large inertia, relatively low structural natural frequencies result that interact with the mirror stabilization servo loops. For the current family of large aperture systems electronic filtering of the past is not always possible because the filters cause servo instability at the inherently lower natural frequencies. Therefore, the need arises for a dynamic damping system which is capable of providing mechanical filtering without impact on servo stability and thereby permitting servo positioning of objects to a high degree of accuracy.

SUMMARY OF THE INVENTION

The instant invention overcomes the problems encountered in the past by providing a dynamic damping system which is capable of substantially eliminating the instability associated with the positioning of large objects, such as mirrors, within inertial space.

The dynamic damping system of this invention finds applicability in the accurate positioning of any large body. However, since a specific problem area encountered recently involves positioning the large mirrors of, for example, infrared sensors, the following description will relate generally to mirrors. It should be realized, however, that the term mirror utilized throughout the specification is in fact synonymous with any large object or body to be so positioned.

The dynamic damping system of this invention mounts a mirror (or any large body) on bearings in a support or frame so that the mirror is free to rotate about a preferred axis. Positional control of the mirror is from a conventional torquer motor which is operably connected in any suitable manner to the shaft of the mirror. Generally the range of motion of the mirror is small, somewhere on the order of ±5°.

Associated with the mirror and secured along the same axis as the mirror is a mirror pulley. An inertia balancer pulley is also mounted on bearings within the support with the rotational axis thereof parallel to the axis of the mirror. Drive of the inertia balancer pulley is from flat steel bands which are mounted between the mirror pulley and inertia balancer pulley. The bands are wrapped between the mirror pulley and the inertia balancer pulley so that the mirror and the inertia balancer pulley rotate in opposite directions.

The inertia of the inertia balancer pulley is proportionally matched to that of the mirror so as to produce inertial bucking torques that will position the mirror at one half the magnitudes of the environmental rotary inputs to the base of the system. The half angle position is a standard requirement for flat mirror systems.

An inherent resonance occurs within the system as a result of the elasticity of the steel bands between the mirror pulley and the inertia balancer pulley. Because the bands are made from steel with a very low inherent damping, the magnitude of the resonance can be very high. If it is sufficiently high it interacts with the mirror control servo causing it to respond at the resonant frequency. The dynamic damping system of this invention suppresses the magnitude of these resonant peaks.

To do so, the dynamic damping system of this invention incorporates therein a dynamic damper. The dynamic damper includes a damper mass interconnected to the inertia balancer pulley by a spring and a damping medium. The spring can be in the form of any spring that can be mechanized to respond to rotary inputs. The damping medium can be in the form of a dash pot or an elastomeric rubber compound with high internal damping.

For successful operation of this invention, the damper mass is tuned to resonate at the same frequency as the inertia balancer pulley. Consequently, when the inertia balancer pulley begins to resonate, the damper mass also begins to resonate, but, since it is out of phase with the inertia balancer pulley, its affect is to back drive the resonant response, and thus suppress the resonant peak magnitude.

It is therefore an object of this invention to provide a dynamic damping system which is capable of suppressing structural resonances, thus permitting accurate servo positioning of large objects.

It is another object of this invention to provide a dynamic damping system which is capable of substantially eliminating structural resonance caused image jitter from large stabilization mirrors.

It is a further object of this invention to provide a dynamic damping system which incorporates therein a spring and damping medium interconnecting an inertia balancer with a damper mass.

It is still another object of this invention to provide a dynamic damping system which utilizes conventional, currently available components that lend themselves to standard mass producing manufacturing techniques.

For a better understanding of the present invention together with other and further objects thereof, reference is made to the following description taken in conjunction with the accompanying drawings, and its scope will be pointed out in the appended claims.

DETAILED DESCRIPTION OF THE DRAWINGS

DETAILED DESCRIPTION OF THE PREFERRED EMBODIMENT

Figure 1:
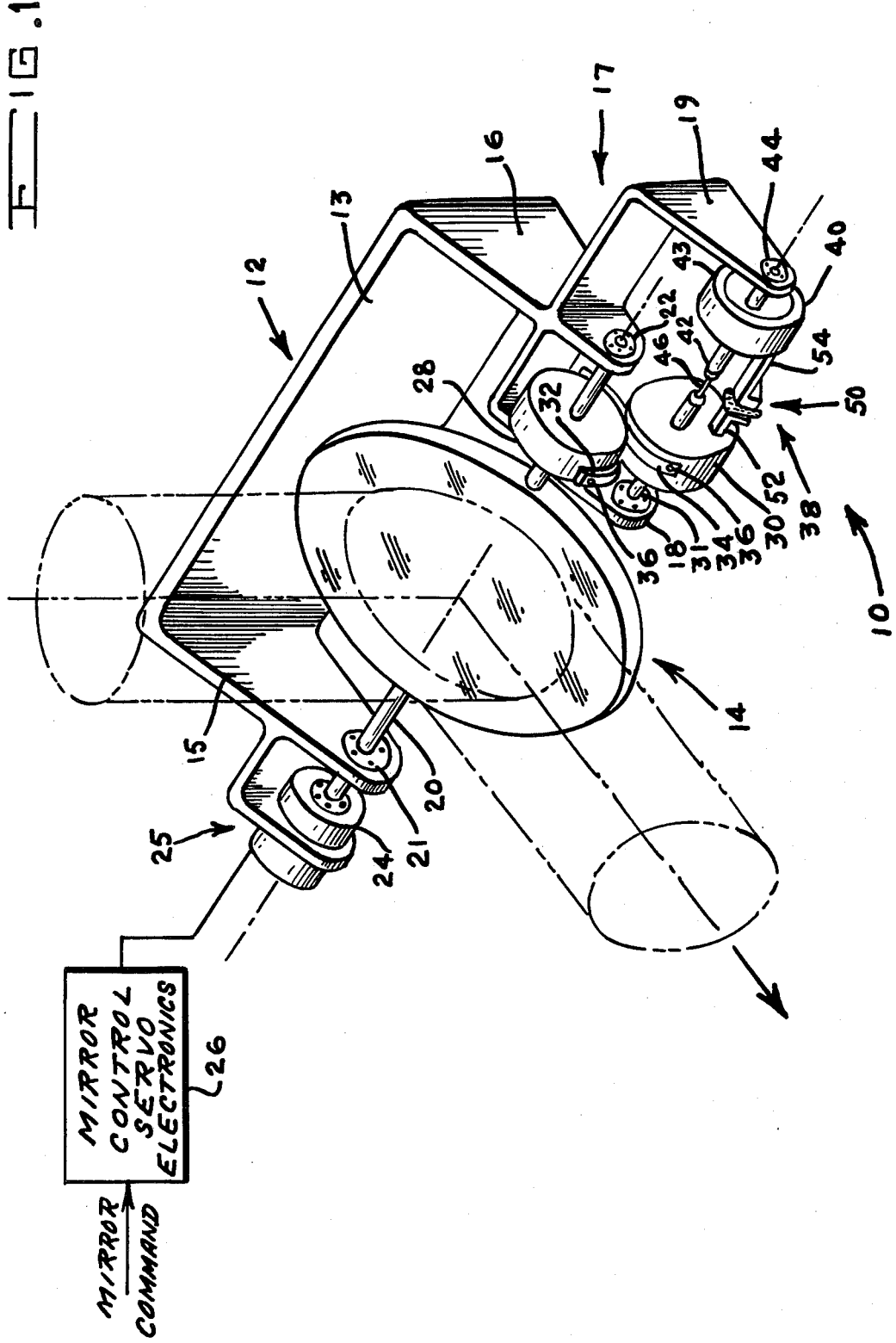
FIG. 1 is a pictorial representation of the dynamic damping system of this invention.

Reference is now made to FIG. 1 of the drawing which pictorially represents the dynamic damping system 10 of this invention. The dynamic damping system 10 is incorporated within a housing or frame 12 which rotatably supports therein any large object or body such as a mirror 14 to be accurately positioned and held with minimal vibration in inertial space. Although the dynamic damping system 10 of this invention is preferably used with a large mirror 14 as the object to be positioned, any other object which is to be held in space can be utilized with the system of this invention.

Although the exact configuration of frame 12 can be varied within the scope of this invention, it is preferable that frame 12 be of a U-shaped configuration having a main support 13 and a pair of outstanding legs 15 and 16. In addition, frame 12 includes a sub-frame 17 extending from one of the legs 16. Sub-frame 17 includes a pair of legs 18 and 19 which mounts therebetween the main components of the dynamic damping system 10 of this invention.

Still referring to FIG. 1 of the drawing, mirror 14 is shown fixedly secured to any suitable mounting shaft or rod 20 passing therethrough. Rod 20 is rotatably mounted at each end thereof within conventional ball bearing units 21 and 22 located within legs 15 and 16, respectively, of U-shaped frame 12.

Positional control of mirror 14 is accomplished by any conventional torquer motor 24 operably connected to rod 20 and also mounted on an extension 25 of frame 12. Any suitable mirror control servo-electronics 26 (the details of which are conventional) not forming part of this invention provides appropriate input signals for motor 24. Also situated along rod 20 is a mirror pulley 28. Mirror 14 therefore rotates in accordance with rotation of rod 20, that being on the order of ±5°.

Mirror pulley 28 is fixedly secured to mirror mounting rod 20 and rotatable therewith. Located juxtaposed mirror pulley 28 and rotatably mounted between legs 18 and 19 of sub-frame 17 is an inertia balancer pulley 30. The rotational axis of inertia balancer pulley 30 is in the form of a support rod 31 coinciding with an axis parallel to the rotational axis of mirror 14.

Drive or movement of the inertia balancer pulley 30 is accomplished by means of a pair of bands 32 and 34, preferably made of steel, which interconnect mirror pulley 28 and inertia balancer pulley 30. Bands 32 and 34 are wrapped on pulleys 28 and 30 so that mirror pulley 28 and inertia balancer pulley 30 rotate in opposite directions. Each band 32 and 34 attaches to the respective pulleys 28 and 30 by any suitable securing means such as screws 36 at each end thereof. The amount of wrap on each pulley depends upon the angle mirror 14 must travel. Since bands 32 and 34 can drive only in tension, the two bands are wrapped in opposite directions to one another. This permits mirror 14 to be driven bidirectionally.

In addition, it is preferable, within the scope of this invention, that the inertia of the inertia balancer pulley 30 and is associated components such as rod 31 be proportionally matched to mirror 14 (including mirror pulley 28 and support rod 26) so as to produce inertial bucking torques that will position mirror 14 at one half the magnitudes of the environmental rotary inputs to the base of the system. This half angle position is generally a requirement for conventional flat mirror systems.

In order to overcome the inherent resonance which occurs because of the elasticity of bands 32 and 34, a dynamic damper assembly 38 is operably attached to inertia balancer pulley 30. The dynamic damper assembly 38 includes a damper mass 40 in the form of a cylindrically shaped body fixedly secured to a support rod 42. Suitable weights 43 may be attached or removed from damper mass 40 to alter the mass thereof. Support rod 42 has one end thereof rotatably supported in any conventional ball bearing assembly 44 located within leg 19 of sub-frame 17. The other end of rod 42 is attached to rod 31 by a spring 46 in a manner to be described hereinbelow. The rotational axis of damper mass 40 is located along the same rotational axis of inertia balancer pulley 30 and parallel to the axis of mirror pulley 28.

Figure 3:
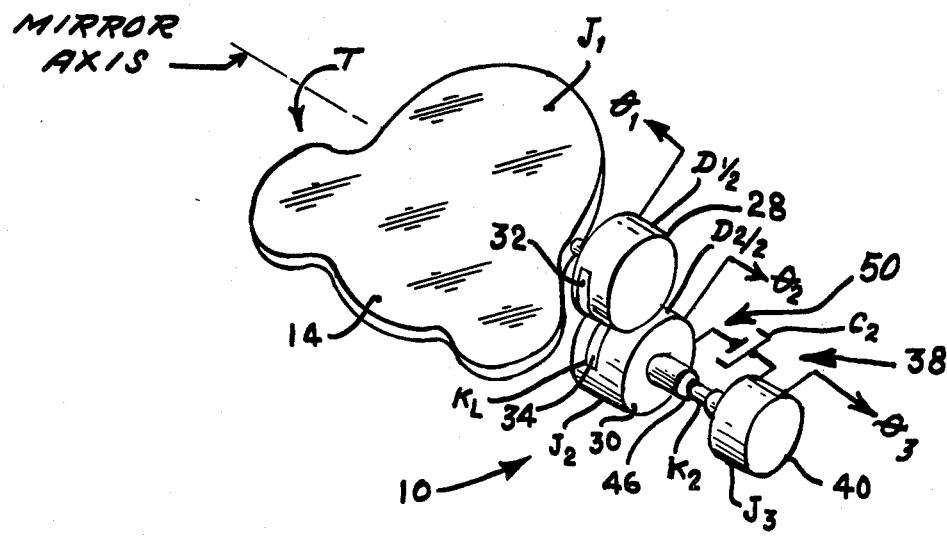
FIG. 3 is a graphic illustration of the damping obtained by the dynamic damping system of this invention.
Figure 4:
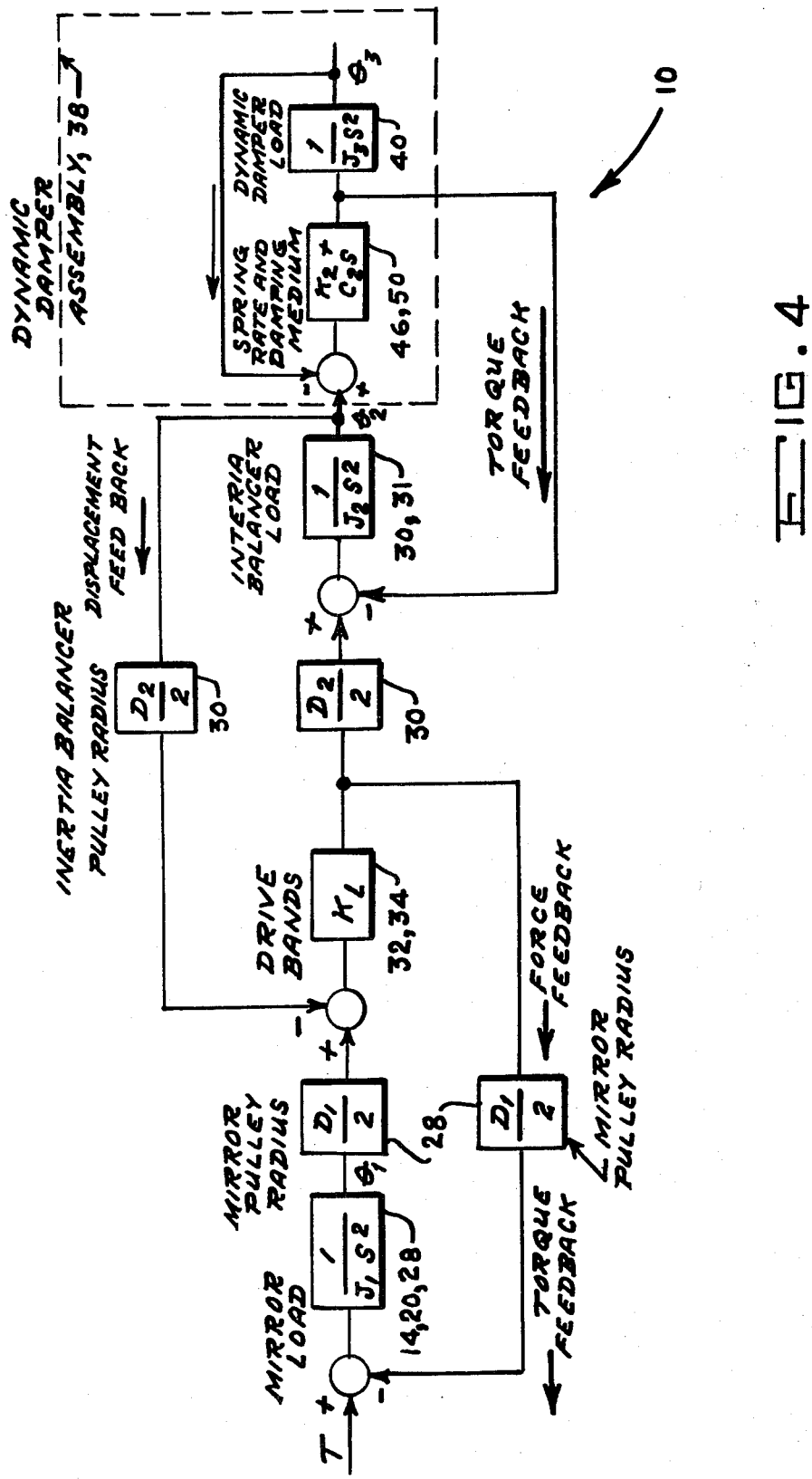
FIG. 4 is a block diagram showing the components of the dynamic damping system of this invention.

Although spring 46 is preferably a torsion spring represented with a spring rate having the symbol $K_2$ (shown in FIGS. 3 and 4) any suitable spring that can be mechanized to respond to rotary inputs can be utilized with this invention. In addition to spring 46 a damping medium 50 in the form of dash pot or made from an elastomeric rubber compound with high internal damping is interconnected between inertia balancer pulley 30 and damper mass 40 by any suitable supporting rods or arms 52 and 54. The symbol $C_2$ (as shown in FIGS. 3 and 4) represents the damping rate of damping medium 50. Damper mass 40 is free to rotate and will resonate at a chosen natural frequency much like a tuning fork resonates. The damping medium 50 governs the magnitude of the response and how fast the resonance will decay if the input disturbance is removed.

For successful operation of this invention the dynamic damper 38 must be tuned by the addition or removal of weights 43 to damper mass 40 in order to resonate at the same frequency as the inertia balancer pulley 30 (including rod 31). Consequently, when inertia balancer pulley 30 begins to resonate, the dynamic damper 38 also begins to resonate, but, since it is out of phase with the inertia balancer pulley 30, its effect is to back drive the resonant response and therefore suppress the resonant peak magnitude.

Figure 2:
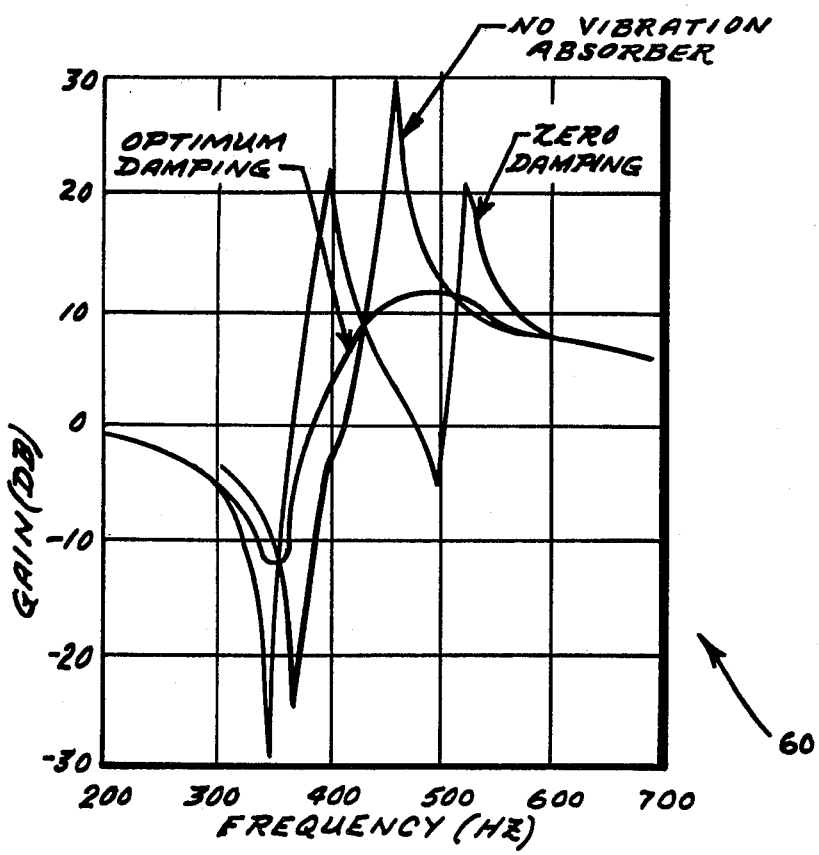
FIG. 2 is a schematic, pictorial representation of the various components of the dynamic damping system of this invention.

Reference is now made to FIG. 2 of the drawing which illustrates a graph 60 representative of a comparison between a mirror assembly utilizing the dynamic damping system 10 of this invention and one in which there is either no dynamic damper mass used or a dynamic damper mass without a damping medium ($C_2=0$). The NO VIBRATION ABSORBER curve shows the typical response of a mirror having no dynamic damping system. Peak magnitude would therefore typically be 30 db. The ZERO DAMPING curve is the response when dynamic damping system 10 of this invention is utilized without a damping medium. In such a case two peaks occur but each peak is much lower in magnitude than the 30 db previously produced. The third curve illustrates OPTIMUM DAMPING. That is the damping medium ($C_2$) being optimized within the dynamic damping system 10 of this invention to produce the best possible smoothing of the otherwise sharp peaks. Generally, performance with this invention is expected to fall between the zero and optimum damping conditions.

Reference is now made to FIGS. 3 and 4 of the drawing which provide, in mathematical terms, an operative example of the dynamic damping system 10 of this invention. The block diagram set forth in FIG. 4 of the drawing describes the dynamics of a flat mirror 14 connected to an inertia balancer through pulleys 28 and 30 with dynamic damper assembly 38 installed as illustrated in FIGS. 1 and 3. The dynamic damper assembly 38 of the block diagram is enclosed by dashed lines.

The block diagram of FIG. 4 is read from left to right, starting with symbol T. T represents torque input from the mirror servo drive motor 24. The input torque (T) is algebraically added to the indicated feedback torque and the result is used to drive the mirror load $1/J_1S^2$ which includes mirror 14, mirror pulley 28 and rod 20. $J_1$ is the mirror load rotary inertia and S is the mathematical Laplace operator. The mirror 14 responds by rotating angle $\theta_1$. Since pulley 28 is attached to mirror 14, pulley motion is also $\theta_1$. The mirror pulley diameter is $D_1$. The motion of mirror pulley 28 is algebraically compared to the motion of inertia balancer pulley 30 (diameter $D_2$). The algebraic sum drives the two steel bands 32 and 34, each of which having a spring rate of $K_L$. The output from bands 32 and 34 ($K_L$) is the force which becomes torque when multiplied by the pulley radius ($D_2/2$). This causes feedback torque to input (T), and feeds forward to drive the inertia balancer load ($1/J_2S^2$) made up of inertia balancer pulley 30 and rod 31. A torque feedback from the dynamic damper assembly 38 also sums prior to driving the inertial balancer pulley 30. The output from the inertial balancer pulley ($\theta_2$) splits to provide displacement feedback and to drive dynamic damper assembly 38. The inertial balancer pulley angle ($\theta_2$) is algebraically summed with the dynamic damper angle ($\theta_3$) and the difference drives a spring ($K_2$) and a damping medium ($C_2$). The output from the spring and damping medium drives the inertia load ($1/J_3S^2$) of dynamic damper assembly 38. The torque from the spring and damper is fed back to the inertial balancer pulley 30 to suppress the resonant response of drive bands 32 and 34 in combination with pulley 30 ($D_2/2$) and its associated inertia load ($1/J_2S^2$).

The loops and feedback paths described by the block diagram of FIG. 4 of the drawing are governed by the laws of physics. The controllable parameters open to a designer are the numerical values of the constants $J_3$, $D_2$, $K_L$, $K_2$, $C_2$, etc. With proper choices of numerical values the inherent band resonances can be suppressed.

It is therefore seen that the function of the dynamic damping system 10 of this invention is to suppress structural resonances. Referring once again to FIGS. 1 and 3 of the drawing, in operation, the mirror torquer motor 24 drives the mirror 14 in response to commands from the mirror control servo electronics 26. Rotation of mirror 14 causes the mirror pulley 28 to rotate which in turn applies tension to one of the two drive bands 32 or 34. Th appropriate drive band 32 or 34 in turn applies a torque to the inertia balancer pulley 30. It is the direction reversals that excites the drive band system resonant frequency. The drive band resonance causes the inertia balancer pulley 30 to oscillate which in turn drives the damper mass 40 through spring 46 and damping medium 50. The damper mass 40 then resonates on spring 46 and damping medium 50 at a frequency turned to the inertia balancer/drive band resonant frequency. When the dynamic damper assembly 38 resonates at the same frequency as the inertia balancer pulley 30 it absorbs resonant energy thus reducing the magnitude of the disturbance to the inertia balancer pulley 30. This in turn reduces disturbances to mirror 14. The importance of reducing mirror disturbances is that uncontrolled oscillatory mirror motion can cause image blur as viewed by the user of the optical system.

Although this invention has been described with reference to a particular embodiment, it will be understood to those skilled in the art that this invention is also capable of further and other embodiments within the spirit and scope of the appended claims.

We claim:

1. A dynamic damping system for stabilizing the motion of an object with respect to inertial space, comprising:
   means for supporting said object for rotation about an axis;
   means operably attached to said object for rotating said object in either of two directions about said axis to a predetermined position; and
   means operably attached to said object for substantially maintaining said object in said predetermined position, wherein said means for substantially maintaining said object in said predetermined position includes a rotatable inertia balancer, said inertia balancer being supported by a first rod positioned within said object support means, said first rod lying along an axis parallel to said object axis, means operably attached to said object for interconnecting said object to said inertia balancer, a rotatable damper mass, said damper mass being supported by a second rod positioned within said object support means, said second rod lying along said inertia balancer axis, means interconnecting said first rod and said second rod for permitting said damper mass to aid in substantially eliminating undesirable movement of said object thereby maintaining said object in said predetermined position.

2. A dynamic damping system as defined in claim 1 wherein said means for interconnecting said first rod to said second rod comprises a spring interconnecting an end of said first rod with an end of said second rod.

3. A dynamic damping system as defined in claim 2 wherein said means for interconnecting said first rod to said second rod further comprises a damping medium interconnecting said inertia balancer and said damper mass.

4. A dynamic damping system as defined in claim 1 wherein said means for interconnecting said object to said inertia balancer comprises means operably connected to said object for transferring the rotation of said object to said inertia balancer.

5. A dynamic damping system as defined in claim 4 wherein said object rotation transferring means comprises a pulley and a pair of bands, said bands being connected between said pulley and said inertia balancer in order to rotate said inertia balancer in a direction opposite to the direction of rotation of said object.

6. A dynamic damping system as defined in claim 5 wherein said means for interconnecting said first rod to said second rod comprises a spring interconnecting an end of said first rod with an end of said second rod.

7. A dynamic damping system as defined in claim 6 wherein said means for interconnecting said first rod to said second rod further comprises a damping medium interconnecting said inertia balancer and said damper mass.

8. A dynamic damping system as defined in claim 7 wherein said damping medium is in the form of a dash pot.

9. A dynamic damping system as defined in claim 7 wherein said damping medium is in the form of an elastomeric material.

10. A dynamic damping system as defined in claim 7 wherein said object is in the form of a large mirror.

* * * * *